(12) United States Patent
McCormack et al.

(10) Patent No.: US 7,203,027 B2
(45) Date of Patent: Apr. 10, 2007

(54) SYSTEM AND METHOD FOR MEASURING THE POSITION OF A TAPE DRIVE HEAD

(75) Inventors: Patrick Henry McCormack, Costa Mesa, CA (US); Turguy Goker, Solana Beach, CA (US); Harold O. Ellison, Huntington Beach, CA (US); Mark Decot, Fountain Valley, CA (US); Jerry Hodges, Riverside, CA (US)

(73) Assignee: Certance, LLC, Costa Mesa, CA (US)

( * ) Notice: Subject to any disclaimer, the term of this patent is extended or adjusted under 35 U.S.C. 154(b) by 0 days.

(21) Appl. No.: 10/986,256

(22) Filed: Nov. 10, 2004

(65) Prior Publication Data

US 2006/0098331 A1   May 11, 2006

(51) Int. Cl.
  G11B 5/584 (2006.01)
  G11B 21/02 (2006.01)
(52) U.S. Cl. .................. 360/77.12; 360/75
(58) Field of Classification Search ............ 250/559.1; 360/241–241.3, 291
See application file for complete search history.

(56) References Cited

U.S. PATENT DOCUMENTS

| | | | |
|---|---|---|---|
| 3,250,480 A | 5/1966 | Jacoby | |
| 3,648,950 A | 3/1972 | Grabl | |
| 4,176,381 A | 11/1979 | De Niet et al. | |
| 4,429,261 A | 1/1984 | Ohno | |
| 4,639,796 A | 1/1987 | Solhjell | |
| 4,677,505 A * | 6/1987 | Nukada et al. ......... | 360/77.12 |
| 4,710,828 A | 12/1987 | Sulzer | |
| 4,866,548 A | 9/1989 | Rudi et al. | |
| 5,079,980 A | 1/1992 | Oakes et al. | |
| 5,207,418 A | 5/1993 | Oakes et al. | |
| 5,379,170 A * | 1/1995 | Schwarz .................. | 360/291 |
| 5,404,525 A | 4/1995 | Endicott et al. | |
| 3,236,429 A | 2/1996 | Klein | |
| 5,508,865 A * | 4/1996 | La Garcia et al. ......... | 360/291 |
| 5,566,378 A | 10/1996 | Nagasawa et al. | |
| 5,592,351 A * | 1/1997 | Carter .................... | 360/261.3 |
| 5,739,984 A | 4/1998 | Eckberg | |
| 5,793,573 A | 8/1998 | Eckberg et al. | |
| 5,949,619 A | 9/1999 | Eckberg et al. | |
| 5,978,172 A * | 11/1999 | Nayak et al. ............ | 360/78.02 |
| 6,005,737 A | 12/1999 | Connolly et al. | |
| 6,118,613 A | 9/2000 | Kojima et al. | |
| 6,359,748 B1 | 3/2002 | Goker | |
| 6,549,363 B2 | 4/2003 | Leonhardt et al. | |
| 6,594,118 B1 | 7/2003 | Nayak et al. | |
| 6,697,209 B2 | 2/2004 | Hughes et al. | |
| 6,710,954 B2 | 3/2004 | Bui et al. | |
| 2003/0107836 A1 | 6/2003 | Zweighaft et al. | |
| 2006/0098328 A1 | 5/2006 | Goker et al. | |

FOREIGN PATENT DOCUMENTS

EP    0 877 372 A    11/1998

* cited by examiner

*Primary Examiner*—K. Wong
(74) *Attorney, Agent, or Firm*—Mark J. Spolyar (57) ABSTRACT

A sensor for measuring the position of the head of a tape drive is disclosed. The sensor includes a light emitter movably connected to the head; a light sensor movably connected to the head and rigidly connected to the light emitter and located to receive a beam of light from said light emitter; and, a light interrupter rigidly connected to the head and located for interrupting the light beam.

12 Claims, 6 Drawing Sheets

SYSTEM AND METHOD FOR MEASURING THE POSITION OF A TAPE DRIVE HEAD

FIELD OF THE INVENTION

The present invention relates to tape drives. More particularly, the present invention relates to measuring the position of the read-write head of a tape drive.

BACKGROUND OF THE INVENTION

High-density recording on multiple tracks of a magnetic tape is known. In certain arrangements, parallel tracks extend along a longitudinal direction of the magnetic tape. The magnetic tape is moved transversely across a read/write head and data is recorded or read. During recording or playback, the head needs to stay in a fixed lateral position relative to the tape as the tape moves in a longitudinal direction.

Some existing tape storage systems contain a mechanism that allows the read/write head to be located at the track's centerline at the beginning of the read/write process. Once the read/write process begins, there is no correction if an offset should arise between the head and the centerline of the track.

To increase storage capacities to meet increased demands, track density, which is the number of tracks per distance (e.g., inches), should be increased. As track density increases, the track pitch and width decrease. For proper read/write operation, the magnetic head must stay at, or very near, the centerline of the track, and the need for precision increases as track density increases.

Figure 1:
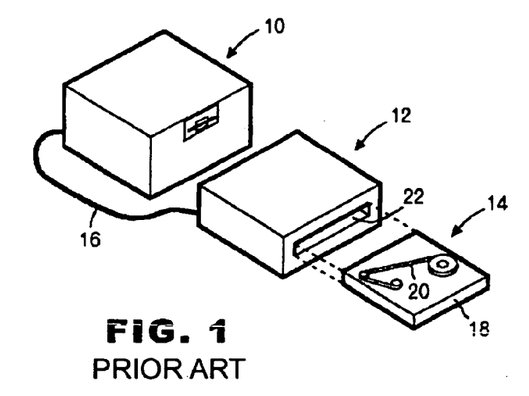
FIG. 1 is a view of a conventional tape drive system.

A conventional tape drive system is shown in FIG. 1. This system comprises a tape drive 12 connected to a host computer 10 by a cable 16, and an associated tape cartridge 14. The tape drive 12 includes a receiving slot 22 into which the tape cartridge 14 is inserted. The tape cartridge 14 comprises a housing 18 containing a length of magnetic tape 20. The tape drive 12 is preferably compatible with the associated host computer, and can assume any one of a variety of cartridge or cassette linear formats.

Figure 2:
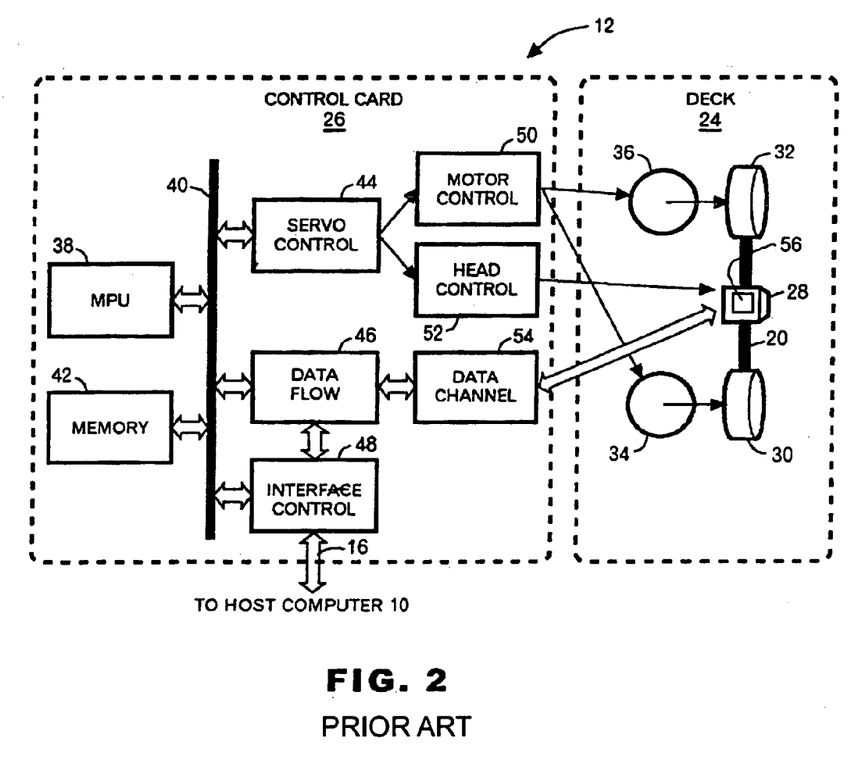
FIG. 2 is a block diagram showing art exemplary arrangement of a control card and tape drive according to the prior art.
Figure 3:
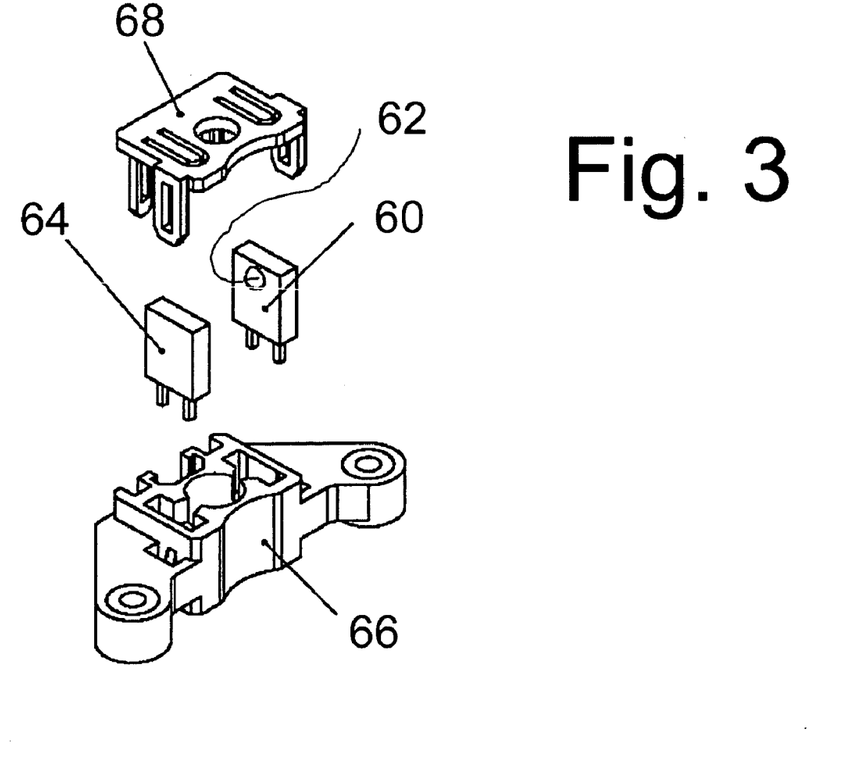
FIG. 3 is an exploded, isometric view of a portion of an optical position sensor according to a preferred embodiment of the present invention.
Figure 4:
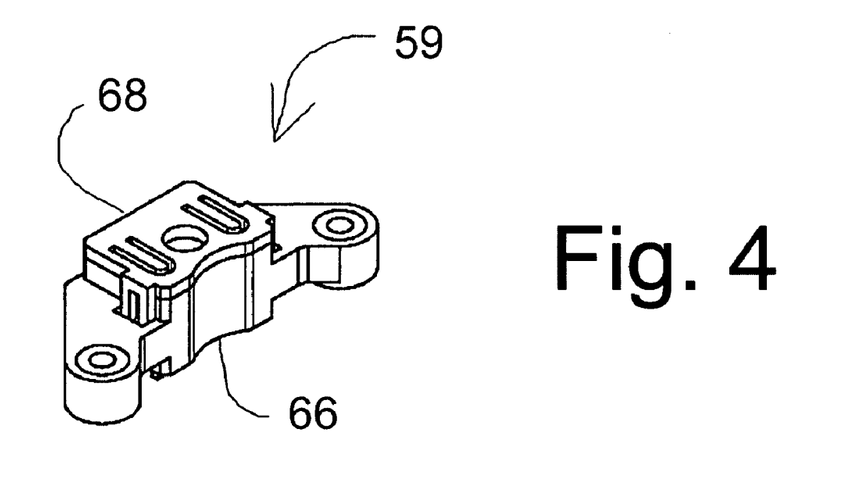
FIG. 4 is a view of the components shown in FIG. 3 with the components assembled.
Figure 5:
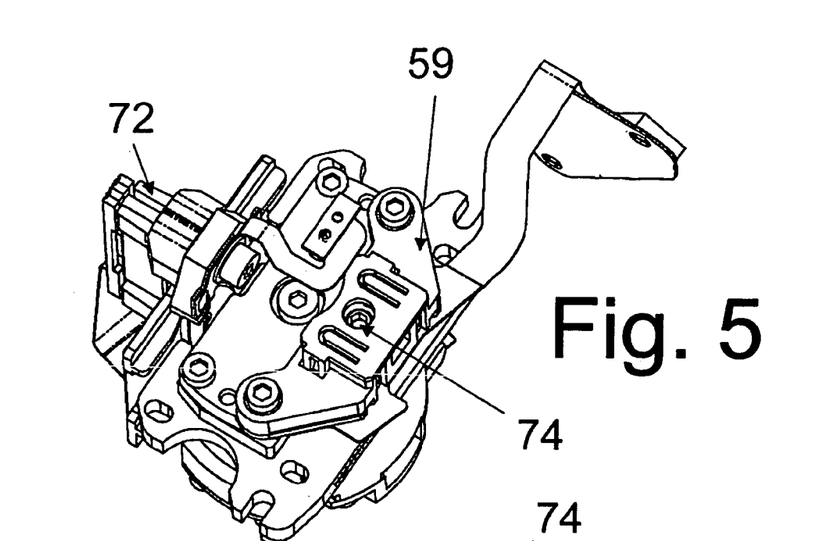
FIG. 5 is a view of the optical position sensor according to a preferred embodiment of the present invention as connected to the read-write head and the VCM.

A typical configuration of the tape drive 12 is shown in FIG. 2. The tape drive 12 in FIG. 2 comprises a deck 24 including movable parts, and a control card 26 including various circuits and buses. The deck 24 includes a head assembly 28 which contacts the tape 20 of the tape cartridge inserted into the tape drive 12 to read and write data and read a servo pattern, and motors 34 and 36 for respectively rotating a supply reel 30 and a take-up reel 32. For a tape cartridge 14 of a dual reel type, both of the reels 30 and 32 are included in the tape cartridge 14. For a tape cartridge 14 of a single reel type, however, only the supply reel 30 is included in the tape cartridge 14 while the take-up reel 32 is provided in the tape drive 12. Although not shown in FIG. 2, the deck 24 additionally includes a mechanism for moving the head assembly 28 across the width of the tape 20, a mechanism for holding the inserted tape cartridge, and a mechanism for ejecting the inserted tape cartridge.

The control card 26 includes a microprocessor (MPU) 38 for the overall control of the tape drive 12; a memory 42, a servo control unit 44, a data flow unit 46 and an interface control unit 48 all of which are connected to the MPU 38 via an internal bus 40; a motor control unit 50 and a head control unit 52 which are connected to the servo control unit 44; and a data channel unit 54 which is connected to the data flow unit 46. While the memory 42 is shown as a single hardware component in FIG. 2, it is actually preferably constituted by a read only memory (ROM) storing a program to be executed by the MPU 38, and a working random access memory (RAM). The servo control unit 44 manages speed control for the motors 34 and 36 and position control for the head assembly 28 by transmitting the respective control signals to the motor control unit 50 and the head control unit 52. The motor and head control units 50 and 52 respond to these control signals by physically driving the motors 34, 36 and positioning the head assembly 28, respectively.

The head assembly 28 includes servo heads which read data from servo tracks or bands on the tape 20. Control card 26 utilizes data from the servo tracks to generate a position error signal (PES), and the PES is used by the servo control unit 44 to cause the head control unit 52 to position the head assembly 28. In some conventional designs the head assembly 28 includes a voice coil motor (VCM) 56 which receives electrical signals from the head control unit 52 and positions the head assembly 28 according to the received signals.

The data flow unit 46 compresses data to be written on the tape 20, decompresses data read from the tape 20 and corrects errors, and is connected not only to the data channel unit 54 but also to the interface control unit 48. The interface control unit 48 is provided to communicate data to/from the host computer 10 via the cable 16. The data channel unit 54 is essentially a data modulating and demodulating circuit. That is, when data is written to the tape 20, it performs digital-analog conversion and modulation for data received from the data flow unit 46, and when data is read from the tape 20, it performs analog-digital conversion and demodulation for data read by the head assembly 28.

In some types of tape drives the head control unit 52 and head assembly can be considered to be essentially a second order type spring-mass actuator system. Actuator systems of this type can have a fundamental resonance that is normally within the loop bandwidth. One of the common features of a second order type spring-mass actuator system is the lack of damping unless damping is designed in as part of the mechanical assembly. Damping provides a controlled step response to the actuator. Too much damping will make the system sluggish while the lack of damping will cause it to ring at the fundamental frequency.

In some applications, damping is achieved by mechanical means, such as the use of grease, ferro fluids, etc. A system of this type is taught in U.S. Pat. No. 5,739,984. In other applications, either the PES or back EMF signal is used to estimate the velocity state variable for the head assembly 28 to be damped, and this information is fed back to the servo control unit 44. U.S. Pat. No. 6,359,748 teaches such use of a back EMF signal. However, these two methods have certain disadvantages. For example, PES is continuous only in defined zones and also it has the relative position information between the head and the tape making the estimation process rather difficult and limited to the availability of PES. In some situations the servo heads are very near the edges of a servo band. Shock and vibration disturbances as well as large lateral tape motion due to staggered wrap tape layers may cause the servo head to move outside the servo band thereby causing loss of the PES. The back EMF signal is difficult to use since its value is normally dependent on the electrical and physical parameters of the actuator, inductance, coil resistance, sense resistance, and magnetic characteristics, making the task to estimate the actuator velocity as a function of back EMF a very difficult and potentially inaccurate. Moreover the back EMF signal is not tunable.

For systems which have predefined sections of tape where the feedback signal is located, such as the Linear Tape Open (LTO) servo feedback method, discontinuous type feedback signals can present a problem. Discontinuous type servo signals occur for e.g. the following reasons: If the tape suddenly moves up or down the head can leave the servo band. While the head is tracking very near the edges of the servo band external shock or vibration can push the head off the servo band.

The use of a VCM with little or no damping in an environment that exhibits discontinuous type feedback can cause the head to oscillate at its natural frequency. With the head oscillating, the reacquisition of tracking normally takes time which results in reduction of system performance.

Accordingly, it is an object of the present invention to provide a system and method to reduce head oscillation. It is another object of the invention to reduce head oscillation by providing a tunable damping system including an optical sensor to sense the position of the head.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of a system and method for tape drive control. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex arid time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Figure 6:
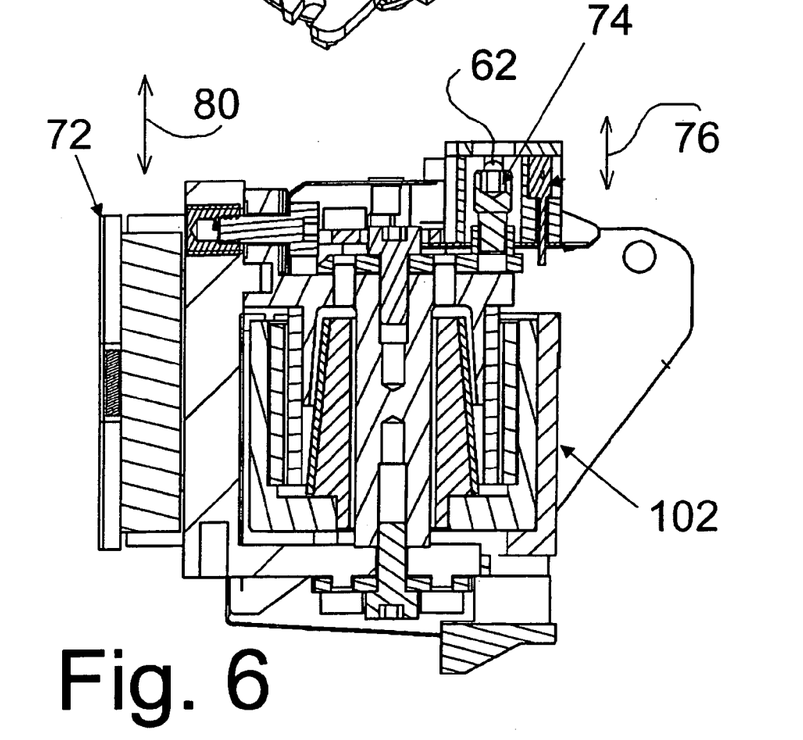
FIG. 6 is a cross sectional view of the optical position sensor, the read-write head and the VCM.

Turning now to FIGS. 3–6A there is shown an optical position sensor 59 which includes optical emitter assembly 60, which includes a light emitting diode, LED 62, and light sensor assembly 64. The emitter assembly 60 and light sensor assembly 64 are mounted in housing body 66 and housing cap 68. The optical position sensor 59 is assembled with read-write head assembly 72 and VCM 102. An adjustable screw 74 is attached in threaded engagement with a center spring clamp 78. FIG. 6 shows the adjustable screw 74 located adjacent to the LED 62 so that the head of the screw 74 partially interrupts the light beam from the LED 62 to the light sensor assembly 64. The adjustable screw can be rotated to move up and down to a selected position as indicated by arrow 76 for the purpose of calibration.

Figure 6A:
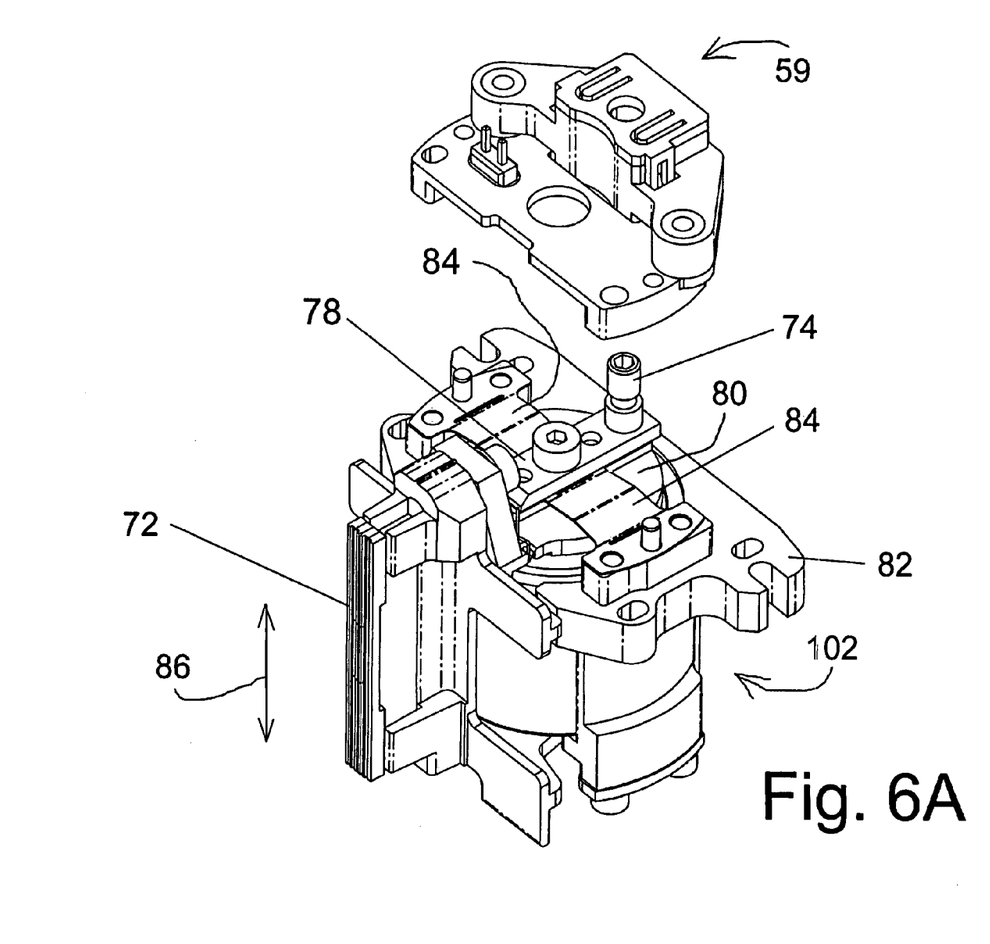
FIG. 6A is a partially exploded, isometric view of the optical position sensor, the read-write head and the VCM.

As best shown in FIG. 6A, the VCM 102 comprises a voice coil assembly 80 which is substantially cylindrical, and the voice coil assembly 80 is located in a cylindrical bore formed in a voice coil housing 82. A top spring element 84 is connected to the top of the voice coil assembly 80 and the voice coil housing 82 by center spring clamp 78, and the top spring element 84 provides a flexible connection between assembly 80 and housing 84. A similar bottom spring element, not shown, is connected to the bottom of the voice coil assembly 80 and the voice coil housing 82. The top and bottom spring elements provide a flexible connection and permit limited vertical motion of the voice coil assembly 80 relative to the voice coil housing 82. The read-write head assembly 72 is rigidly connected to the center spring clamp 78.

It should now be understood that the read-write head 72, the voice coil assembly 80, the center spring clamp 78 and adjustable screw 74 are all rigidly connected to each other so that they all move up and down together as a unit. On the other hand, optical position sensor 59 is isolated from those components so that optical position sensor 59 does not move with those components. Rather, the optical position sensor 59 is rigidly connected to the voilce coil housing 82, which, in turn is rigidly connected to the housing of the tape drive. Accordingly, as the read-write head assembly 72 moves up and down as indicated by arrow 86, the head of the adjustable screw 74 partially interrupts the beam of light received by the light sensor assembly 64 from the LED 62, and the extent of light interruption is directly proportional to the relative vertical position of the optical position sensor 59 with respect to the read-write head assembly 72. The light sensor assembly 64 produces electrical signals corresponding to the light it receives, and the electrical signals are used by the control system discussed hereinafter.

Figure 7:
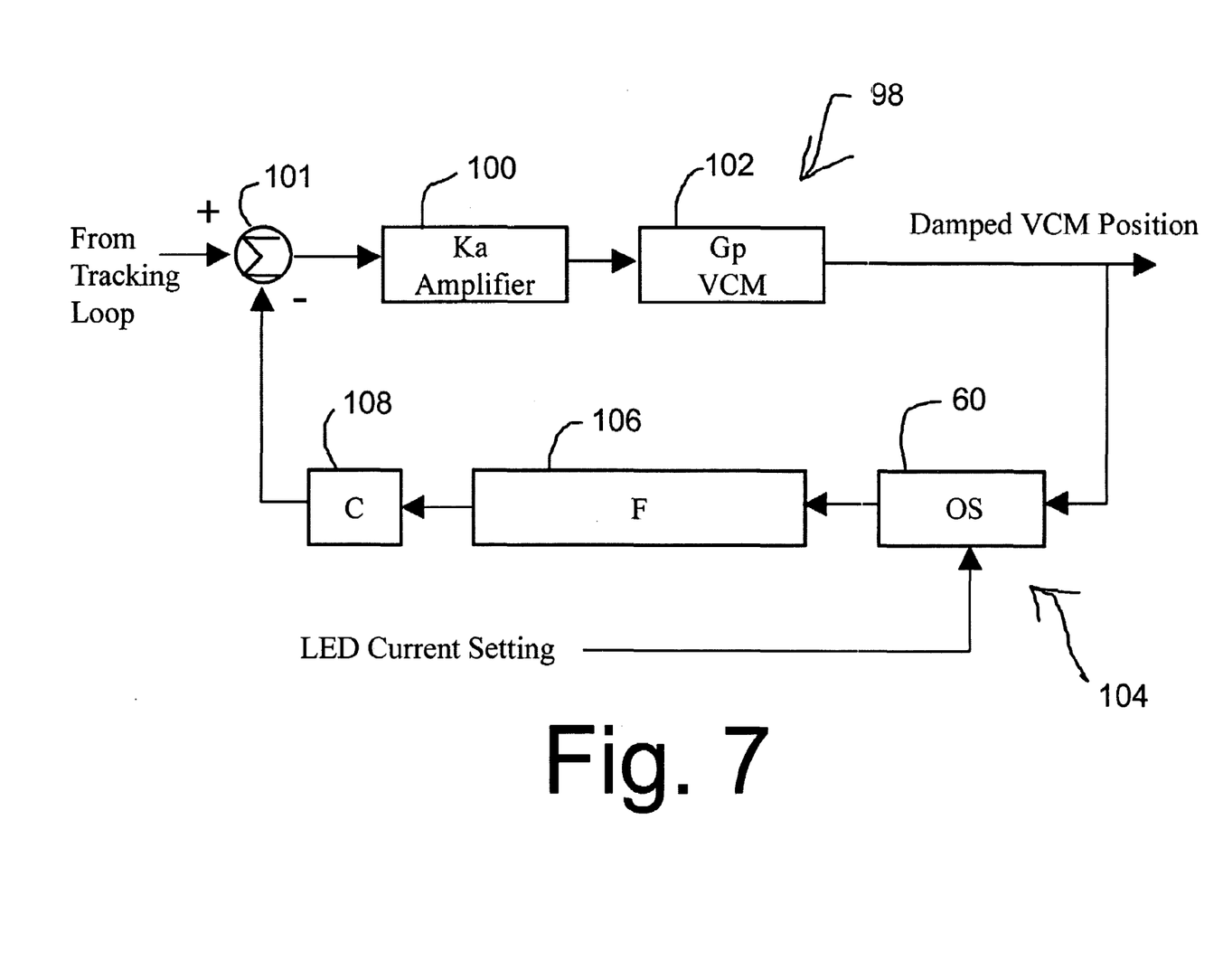
FIG. 7 is a block diagram of a control system according to a preferred embodiment of the present invention.

Turning now to FIG. 7 there is shown a block diagram schematically illustrating a control system 98 according to a preferred embodiment of the present invention: The control system includes a summer 101, an amplifier 100, and a VCM 102, which is affixed to a head assembly 28. The gain of the amplifier 100 is Ka, and the transfer function of the VCM and head assembly is Gp. The control system 98 further includes feedback loop 104 including the optical sensor 60 and a filter 106, and the block 108 indicates that the gain C of the feedback loop can be controlled. The filter 106 is AC coupled and has the transfer function:

$$F = \frac{ks}{\tau s + 1}$$

The variable k is the gain and $\tau$ is the time constant. The filter 106 can be a lead-lag filter which differentiates the input signal and applies low pass filtering.

The control system 98 is connected so that the summer 101 receives a signal from the tracking loop and subtracts from the tracking loop signal a signal from the feedback loop 104. The signal from the tracking loop represents the target position of the VCM and is generated by the servo control unit 44 and head control unit 54. However, the signal from the tracking loop can be generated by other conventional means.

In practice, variability in the gain of optical sensor 60 due to aging, temperature, humidity and lot to lot variations could result in variability of damping for the system. Furthermore, excessive damping could cause a sluggish and slow system while insufficient damping may result in too much overshoot during transients. Therefore it is desirable to have the ability to control the extent of damping to account for the particular characteristics of a system. In other words, the damping is tunable.

Moreover, the ability to control damping is desirable in order to obtain a predictable response of the system in both the gain and phase of the loop. For example, for systems which we have modeled we have found that higher damping provides more phase at the critical region, which is desirable for phase margin and stability. However, lower damping provides more suppression in the critical region. Therefore there is an optimum damping value that will satisfy both the phase and suppression requirements. Consequently we provide a calibration algorithm that adaptively tunes the damping to maintain the optimized value.

We have found that controllable damping can be accomplished by calibrating the feedback loop 104 using the LED current. This is true because LED current is proportional to the damping applied by the feedback loop 104.

Figure 8:
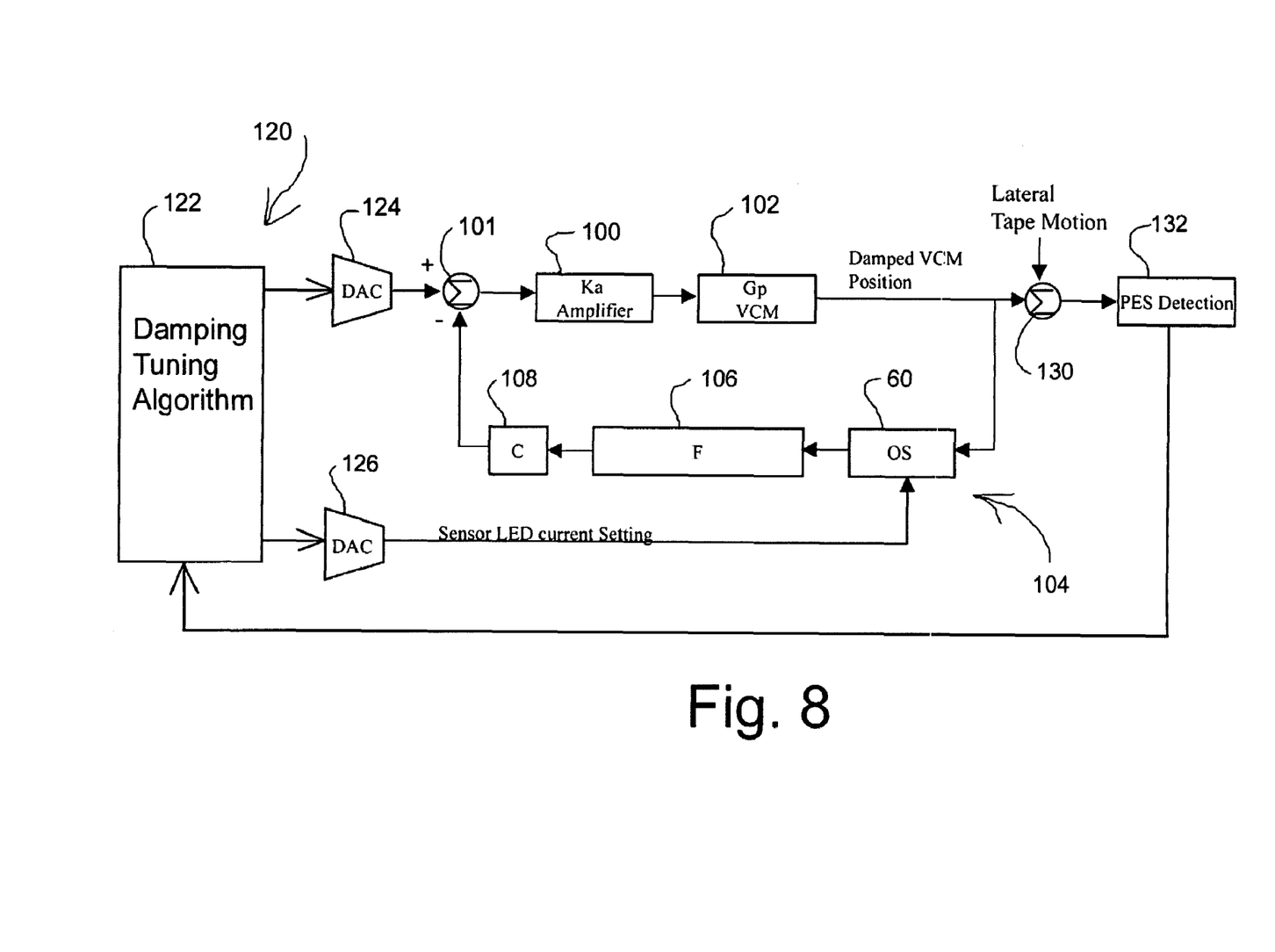
FIG. 8 is another block diagram of a control system according to a preferred embodiment of the present invention.

To calibrate the feedback loop 104 a calibration system 120 shown in FIG. 8 is used. The calibration system 120 includes a damping tuning algorithm 122 which can execute in a microprocessor such as microprocessor 38. The system also includes two digital to analog converters (DAC's) 124 and 126 to receive digital signals computed by the damping tuning algorithm 122. The first DAC 124 transmits analog signals to the summer 101 and the second DAC 126 establishes setting for the LED current to the optical sensor 60.

In operation, the damped VCM position signal controls the position of the head assembly 28. As represented by summer 130, lateral motion of the tape is added to lateral motion of the head assembly, and the resulting total motion is measured by conventional servo control system 44 to generate PES 132.

The damping tuning algorithm 122 sends a set of digitized sine wave signals to the VCM amplifier reference DAC 124 that controls the line labeled "From Tracking Loop" in FIG. 7. The damping tuning algorithm 122 collects PES data as the tape is moved across the head at a constant speed. The damping tuning algorithm 122 implements this as a background task as the tape is moving and the drive is not doing read/write data transfer but rewinding or searching for a location. Therefore the normal operation of the drive is not interrupted. This background calibration continuously maintains optimum damping.

The damping tuning algorithm 122 uses a curve fit algorithm to calculate the transfer function of PES to the sensor current LED setting using a second order function fit. It does this for three different LED currents, high, medium and low. Once the damping tuning algorithm 122 has computed the damping coefficients for all 3 different LED currents, the algorithm 122 fits a third order function to calculate the LED current for the targeted damping coefficient. It can now load this value in the LED current control DAC 126.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A sensor for measuring a position of a head of a tape drive, the sensor comprising:
    a light emitter movably connected to the head;
    a light sensor movably connected to the head and rigidly connected to the light emitter and located to receive a beam of light from said light emitter; and,
    a light interrupter rigidly connected to the head and located for interrupting the light beam, said light interrupter comprising an adjustable screw operatively engaged to displace the light interrupter relative to the light emitter and the light sensor, to provide for calibration.

2. A sensor according to claim 1 wherein said light emitter is movably connected to said head by a spring.

3. A sensor according to claim 1 wherein said light sensor is movably connected to said head by a spring.

4. A sensor according to claim 1 wherein said light interrupter comprises an interrupter head located at least partially in the light beam.

5. A sensor according to claim 1 wherein said light emitter comprises a light emitting diode.

6. A sensor for measuring the position of the head of a tape drive, said sensor comprising:
    a housing movably connected to the head;
    a light emitter rigidly connected to said housing;
    a light sensor rigidly connected to said housing and located to receive a beam of light from said light emitter; and,
    a light interrupter rigidly connected to the head for interrupting at least a portion of the light beam, said light interrupter comprising an adjustable screw operatively engaged to displace the light interrupter relative to the light emitter and the light sensor, to provide for calibration.

7. A sensor according to claim 6 wherein said housing is movably connected to said head by a spring.

8. A sensor according to claim 6 wherein said sensor measures the position of the head relative to said housing.

9. An apparatus, for damping the motion of the head of a tape drive, comprising:
- a sensor for measuring a position of a head of a tape drive, the sensor further comprising
- a light emitter movably connected to the head,
  - a light sensor movably connected to the head and rigidly connected to the light emitter and located to receive a beam of light from said light emitter, and,
  - a light interrupter rigidly connected to the head and located for interrupting the light beam, said light interrupter comprising an adjustable screw operatively engaged to displace the light interrupter relative to the light emitter and the light sensor, to provide for calibration;
- a feedback control connected to the sensor for damping the motion of the head based on the measured position of the head over time; and
- logic for tuning the damping by varying a parameter of the sensor.

10. An apparatus according to claim 9 wherein said sensor comprises a light emitting diode and said parameter is the current applied to the light emitting diode.

11. An apparatus according to claim 10 further comprising a damping tuning means for applying a signal to the head and measuring the response of the head to the signal.

12. An apparatus for damping the motion of the head of a tape drive comprising:
- a sensor for measuring a position of a head of a tape drive, the sensor further comprising
- a light emitter movably connected to the head,
  - a light sensor movably connected to the head and rigidly connected to the light emitter and located to receive a beam of light from said light emitter, and,
  - a light interrupter rigidly connected to the head and located for interrupting the light beam, said light interrupter comprising an adjustable screw operatively engaged to displace the light interrupter relative to the light emitter and the light sensor, to provide for calibration;
- feedback means connected to the sensor for damping the motion of the head based on the measured position of the head over time; and
- tuning means for tuning the damping by varying a parameter of the sensor.

* * * * *